(12) United States Patent
Gill

(10) Patent No.: US 6,347,782 B1
(45) Date of Patent: Feb. 19, 2002

(54) AXIAL ACTUATOR

(76) Inventor: Ajit Singh Gill, 4169 Bennion Rd., Salt Lake City, UT (US) 84119

( * ) Notice: Subject to any disclaimer, the term of this patent is extended or adjusted under 35 U.S.C. 154(b) by 0 days.

(21) Appl. No.: 09/494,727

(22) Filed: Jan. 31, 2000

(51) Int. Cl.[7] .............................................. F16K 31/12
(52) U.S. Cl. .............................. 251/58; 251/62; 74/109; 92/136
(58) Field of Search ........................... 251/58, 62, 250; 74/109, 89.17, 89.13; 92/136

(56) References Cited

U.S. PATENT DOCUMENTS

| | | | |
|---|---|---|---|
| 2,574,916 A | * 11/1951 | Gordon | 251/58 |
| 3,542,331 A | * 11/1970 | Canalizo | 251/58 |
| 3,602,478 A | * 8/1971 | Cairns | 251/58 |
| 4,323,221 A | * 4/1982 | Krober et al. | 251/58 |
| 4,325,535 A | * 4/1982 | Foster | 251/58 |
| 4,354,424 A | * 10/1982 | Nordlund | 92/136 X |
| 4,377,179 A | * 3/1983 | Giebeler | 251/58 X |
| 4,504,038 A | * 3/1985 | King | 251/58 |
| 4,647,003 A | * 3/1987 | Hilpert et al. | 251/62 X |

* cited by examiner

*Primary Examiner*—Joseph A. Kaufman
*Assistant Examiner*—John Bastianelli
(74) *Attorney, Agent, or Firm*—Mallinckrodt & Mallinckrodt; Robert R. Mallinckrodt

(57) ABSTRACT

An axial actuator for actuating a valve by rotating the shaft of the valve includes an outer enclosure forming an interior space having an inner enclosure therein. A piston is linearly moveable within the interior space of the outer housing to divide such interior space into two chambers, one of which includes the inner enclosure. A rotation device is positioned at least partially within the inner enclosure and is interconnected with the piston for rotating the valve shaft in response to linear movement of the piston. The rotation device preferably includes a rotation bevel gear having a hub adapted to receive the valve shaft to be rotated and compound pinion gears each with a bevel pinion gear which mates with the rotation bevel gear and a spur pinion gear which mates with racks which extend from the piston. Movement of the piston causes movement of the racks which rotate the compound pinion gears. This, in turn, rotates the rotation pinion gear and the valve shaft.

17 Claims, 11 Drawing Sheets

SECTION 1-1

SECTION 2-2

SECTION 4-4

SECTION 3-3

SECTION 5-5

SECTION 2-2

AXIAL ACTUATOR

BACKGROUND OF THE INVENTION

The invention is in the field of quarter, half, or full turn valves like butterfly or ball valves. There are various types of actuators available to turn the shaft of valves. There are actuators where the rotatable shaft of the valve is actuated by an acme drive screw or by ninety degree pneumatic actuators such as Keystone actuators. There are pneumatic rack and pinion rotary actuators; where racks are mounted at ninety degrees to the pinion on the shaft of the valve; pneumatic scotch yoke actuators; and a helical groove design actuator manufactured by Helac Corporation (Enumclaw, Washington). There are also eccentric multi-gear actuators. Engineers have tried to incorporate as many utilizable features in the actuators as possible. Thus it is an object of this invention to provide a universal actuator which will meet the wider needs of the industry.

It is an object of this invention to provide an actuator which is compact, economical; concentric and symmetric to the shaft of the valve in its geometrical design, and has an axial orientation in the direction of the shaft which drives the valve.

It is an object of this invention to provide an actuator which readily can be modified to meet the various requirements of valves, while retaining its central core feature.

It is another object of this invention to provide an actuator which is efficient and can provide maximum torque, with respect to its relative size, compared to other actuators.

It is another object of this invention to provide manual override which is self locking.

It is another object of this invention to provide an actuator having dependable fail safe closure, by means of springs, in the event of electric or air supply failure.

It is another object of this invention to provide an actuator which can be actuated by hydraulic or pneumatic means, or by means of an electric motor, or manually.

It is another object of this invention to provide an actuator which can incorporate in its design multi-springs in multi-locations of its body.

It is another object of this invention to provide an actuator where springs can quickly and easily be taken out from any chamber or cavity or cavities to modify the functions of the actuator.

It is another object of this invention that the parts of the actuator can be inspected or replaced readily in the field when the manual override drive takes control of the valve.

It is also an object of this invention to provide an actuator where a number of springs and their reaction time can be changed to provide customized torque output to a specific application.

It is another object of this invention that the actuator can also be operated hydraulically by reversible pump.

It is another object of this invention that the actuator will have a minimum number of moving seals.

SUMMARY OF THE INVENTION

According to the invention, an axial actuator has a body made of two integrated concentric cylindrical enclosures of differential height. The space above the inner enclosure is divided by a piston disk into two parts, and a third part includes space which lies inside and around the inner enclosure. Thus, said three parts create three chambers A, B, and C in the axial direction of the shaft of the valve; chamber A being farthest from the valve, chamber B being the intermediate chamber, and chamber C being nearest to the valve, around the shaft of the valve. A cavity is also provided to encircle said inner enclosure.

Under the first alternative, said chambers and said encircling cavity around the inner enclosure accommodate synchronized functionary means. These means include a piston disk between chambers A and B and a compression spring in chamber B, which reacts against said piston disk. Also included, in chamber C nearest to the valve, is a main bevel gear, which is connected to the shaft of the valve by means of its hub while its teeth are engaged with bevel pinions of compounded pinions supported by the inner enclosure. On the opposite ends of said compounded pinions are spur pinions engaged with rack gears which project axially like arms from the rim of said piston disk into said cavity encircling chamber C. Also, said cavity encircling Chamber C is shared by compression springs which react against said piston disk. The compounded pinion is an assembly of two pinions having a spur pinion gear on one end and a bevel pinion gear on the other end of a common shaft. By actuating said piston all the synchronized functionary components are actuated to actuate the shaft to open or to close the valve.

Under the second alternative, individual cavities are provided for compression springs. There are also individual cavities provided for spur pinions which are engaged with the rack gears. Said individual cavities lie on a circle around Chamber C. The difference between this second alternative, compared to the first, is that the wall of the inner enclosure is now integrated with the wall of the outer enclosure. The height of the inner cylindrical enclosure is designed to be less than the height of the outer cylindrical enclosure by a predetermined difference to accommodate the stroke of the piston which divides Chamber A from Chamber B. The piston can be actuated by various means: pneumatic, hydraulic, an electric motor, or compression springs. Other means include using a screw shaft, a shaft having helical grooves around its outer surface, or a worm and a worm gear override drive. The actuator of the invention is designed on the principle that the vertical distance the rack gears travel, in unison, must produce the desired quarter, half, or full turn of the shaft of the valve through synchronous means; said synchronous means being the compounded pinions, the main bevel gear and compression springs.

If a customer needs it, the actuator can be provided with a manual override drive. The manual override drive consists of a shaft which is driven from outside the actuator; two spur gears and two worms held in tandem around a worm gear, where said worms act as a couple to rotate said worm gear which is integrated with the main bevel gear in chamber C. Said worm gear rotates the shaft of the valve. As the actuator is designed to meet universal needs of quarter turn valves, the invented actuator can easily be modified in the shop or in the field according to the needs of the customer.

BRIEF DESCRIPTION OF THE DRAWINGS

The best mode presently contemplated for carrying out the invention is illustrated in the accompanying drawings in which.

DETAILED DESCRIPTION OF THE ILLUSTRATED EMBODIMENT

Figure 1:
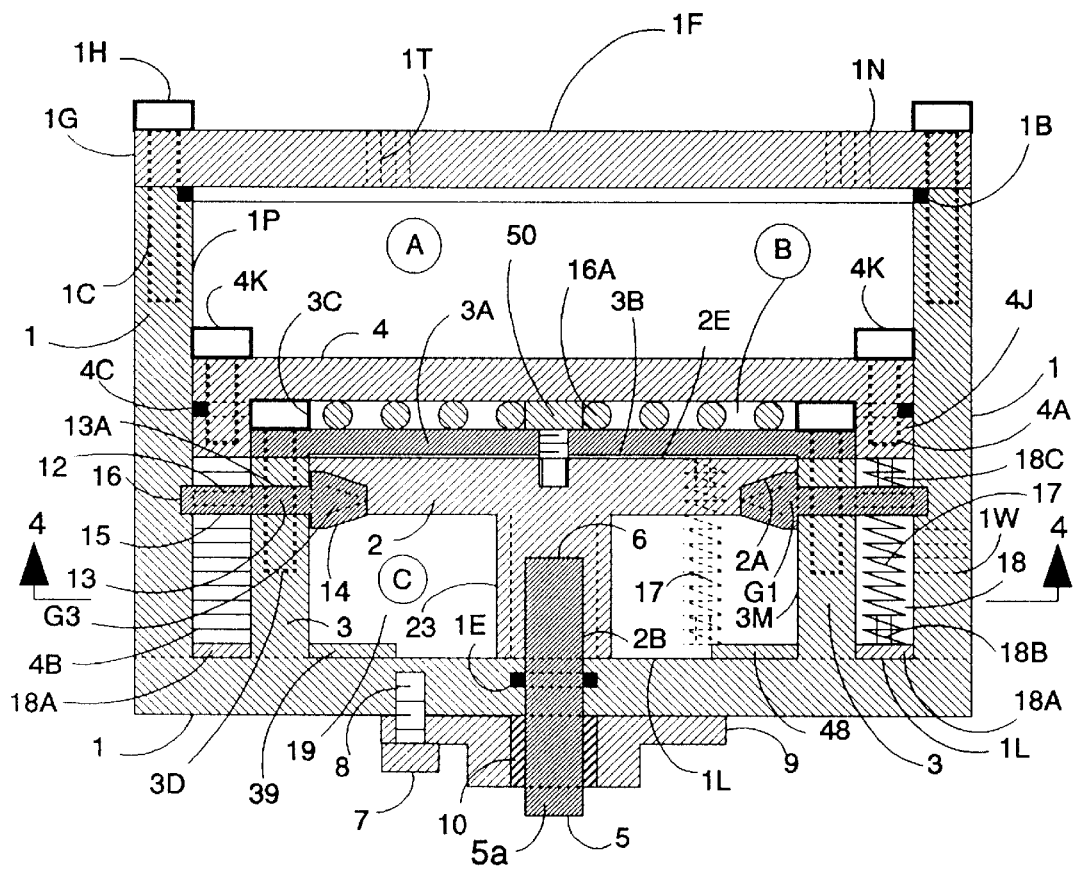
FIG. 1 is a vertical section of the basic design of the axial actuator of the invention, taken through the two compounded pinions engaged to the main bevel gear.

Except for the manual override drive, all the elements of the axial actuator are concentric or symmetrically located about the shaft of the valve, and therefore all of the figures in the drawings can be studied together. It should be noticed that the drawings are not to any true scale.

Figure 5:
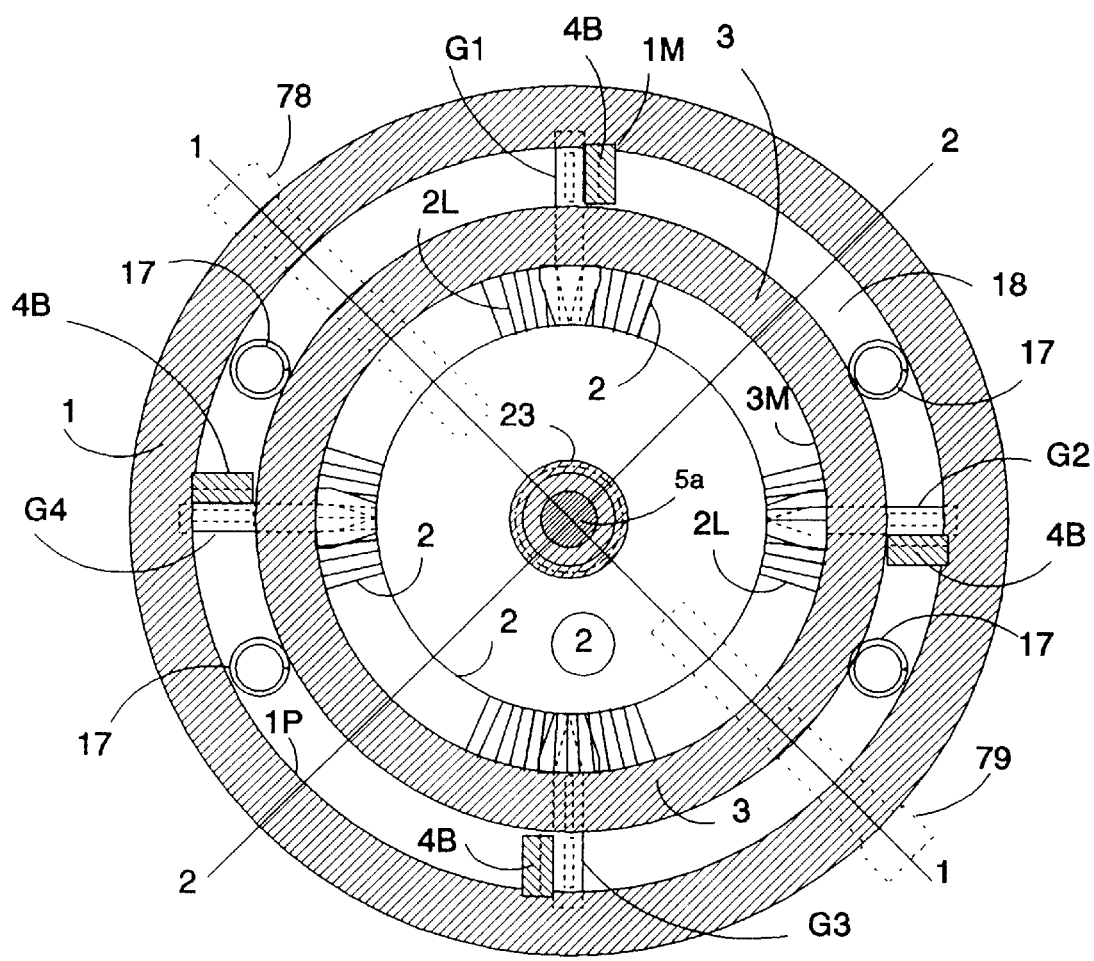
FIG. 5 is a transverse section taken on the line 4—4 in FIG. 1.

To grasp the concept of this invention quickly, first the basic design of the actuator in FIGS. 1 and 5, 10 and 13 will be studied. FIGS. 1 and 5 together and FIGS. 10 and 13 together depict two different alternatives for the installation of the compression springs, the racks, and the compounded pinions. Under both alternatives, to accommodate functionary means to actuate the shaft of the valve, the invented actuator has three chambers A, B and C, located in the axial direction of the shaft A. The difference between the two alternatives is only in the design of the cavities in which compression springs 17 and racks 4B are installed. In FIGS. 1, 2, 5 and 10 the inside diameter or inner surface of enclosures 1 and 3 are shown by 3M and 1P.

Figure 6:
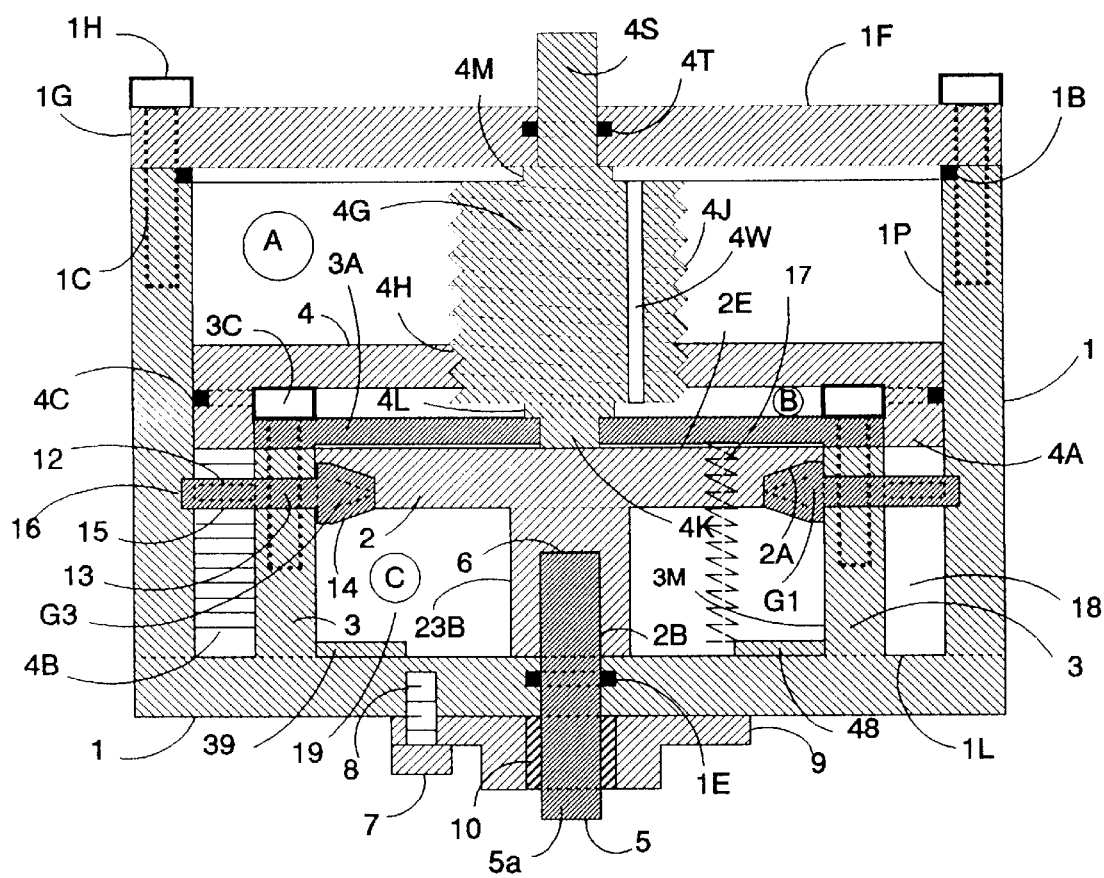
FIG. 6 is a vertical section similar to that of FIG. 1, but showing a threaded screw drive installed in chambers A and B to drive the piston.
Figure 7:
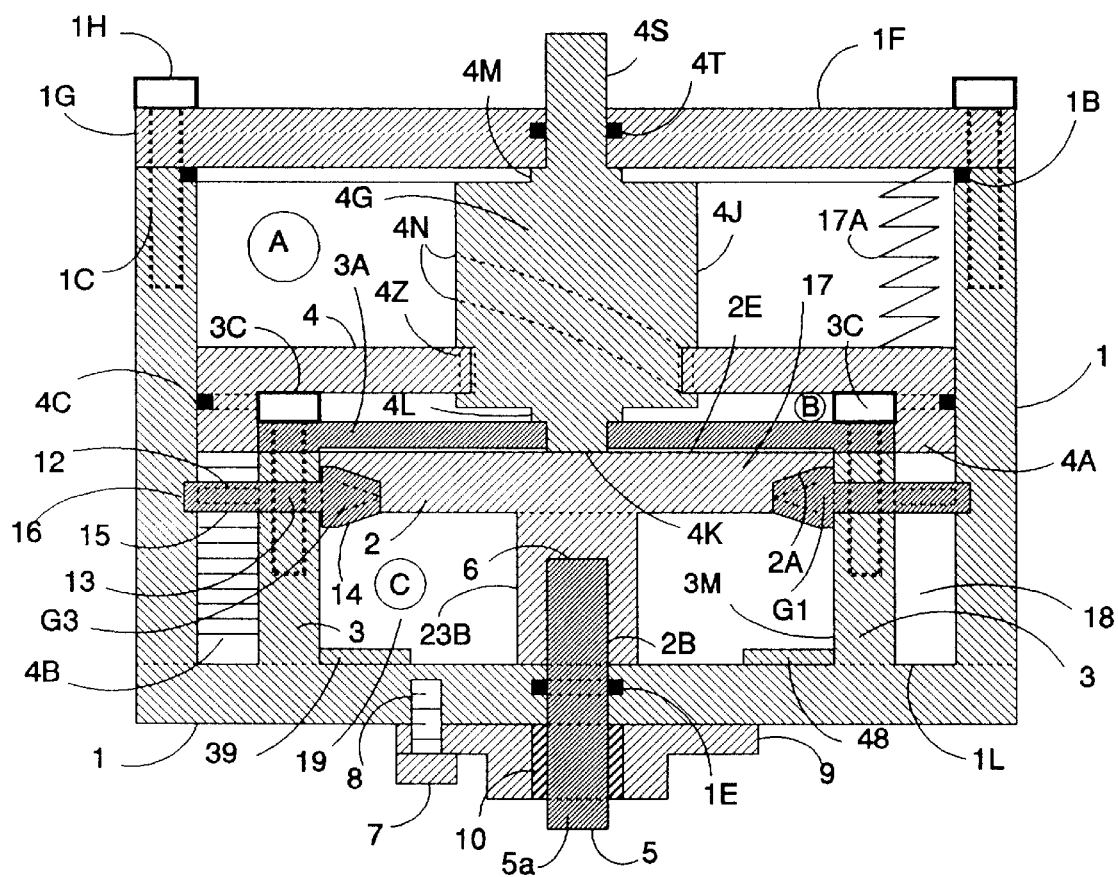
FIG. 7 is a vertical section similar to that of FIG. 6, except, instead of a threaded screw drive, helical grooves are used.
Figure 11:
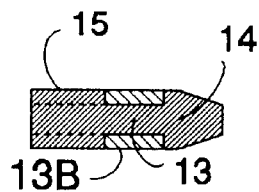
FIG. 11 is a vertical section of an alternate design of the compounded pinions.
Figure 10:
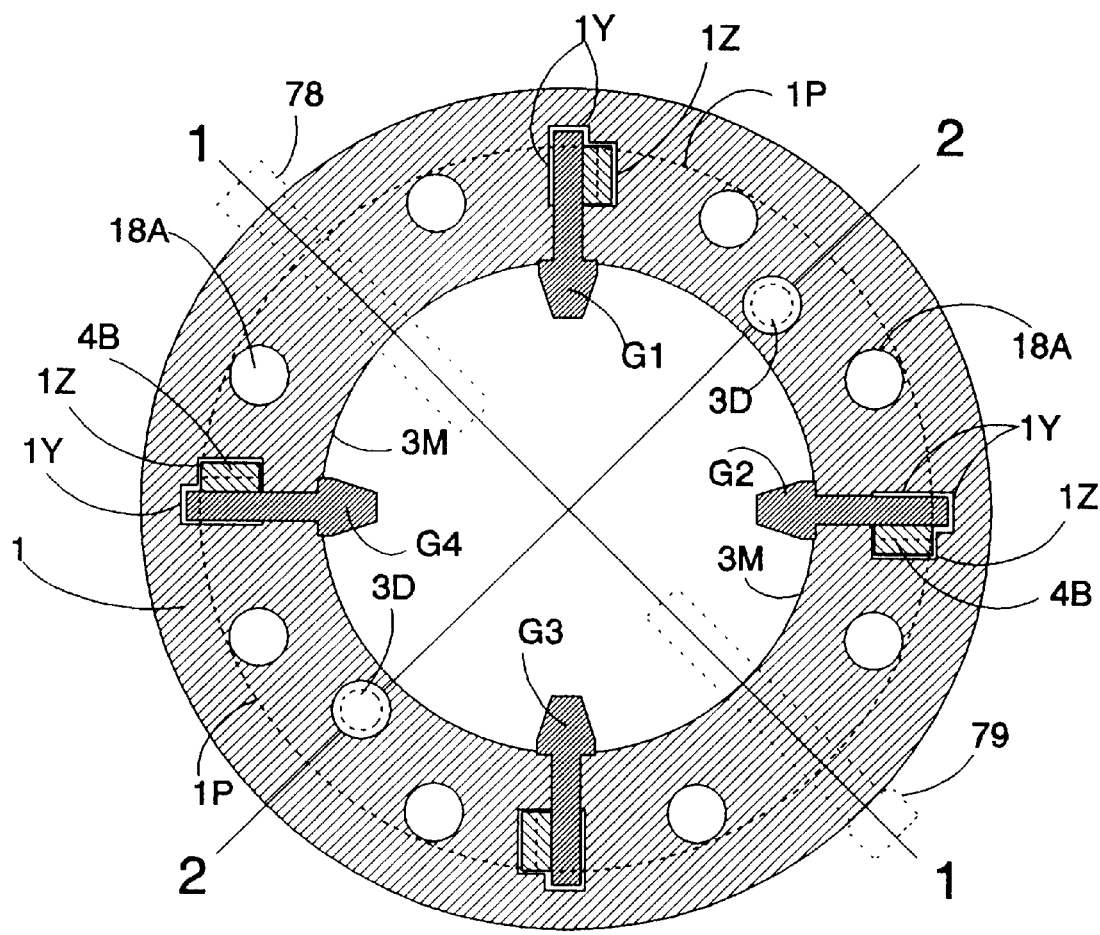
FIG. 10 is a transverse section taken on the line 5—5 of FIG. 13, showing a second alternative design for mounting the compression springs and compounded pinions, where the main bevel gear in chamber C is not shown, but the compounded pinions are included.
Figure 12:
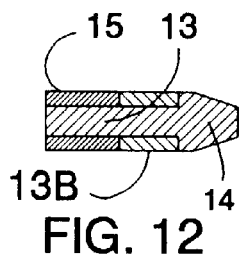
FIG. 12 is a vertical section of another alternate design of the compounded pinions.

Under the first alternative, shown in FIGS. 1 and 5, the actuator has a body made of two integrated concentric cylindrical enclosures which have walls 1 and 3 and covers 1F and 3A. The actuator is assembled from inside chamber C. First, the compounded pinions depicted by G1, G2, G3 and G4 are mounted in walls 1 and 3, into the matching opening 13A in wall 3 and matching hole 16 in wall 1. The compounded pinions shown in FIGS. 1, 11 and 12 include two pinions; a bevel pinion gear 14 and a spur pinion gear 15. The three FIGS. show three variations in construction of the compound pinions. The pinions are held together by means of a common stem 13 as shown in FIG. 1 and FIG. 11, or by a stem 13 which is a shaft to which spur pinion gear 15 is attached as shown in FIG. 12. 13A represents a bearing that could be used, or could merely be the inner enclosure wall 3 in which the stem 13 is journaled. It is equally possible that in the compounded pinions both pinions can share a common shaft. It is equally possible that both pinions can share a common shaft which is mounted through an opening from outside the actuator, and it is kept in place by capping its outer end with a threaded bolt mounted in wall 1. It is understood that the word "shaft" defines a shaft which can have composite cross sections; where it can be circular in cross section in one portion of the shaft and also it can be rectangular or square in cross section in another portion of the same shaft, and the diameter of the shaft can also vary from section to section. The word "stem" will be synonymous with the word "shaft" as just described. Once the compounded pinions are installed in their places then bevel gear 2 along with hub worm gear 23 with cavity 2B is installed over said compounded pinions and over and around shaft A of the valve. It should be noted that if an override drive is not installed then 23 is not a worm gear, but only a hub of gear 2 as shown in FIGS. 6 and 7. The length of shaft A is depicted by its two ends 5 and 6. Gear 2 is rotatable, and is held in place by means of cover 3A, which cover is fastened by bolts 3C and a partitioner bolt 50. Gear 2 remains rotatable by creating a gap 2E between bevel gear 2 and cover 3A. After placing 3A in place, ring 18A, holding spikes 18B, and compression springs 17, are installed in cavity 18. After this, spring 16A is installed over cover 3A. After installing spring 16A, piston disk 4, bearing bolts 4K, spikes 18C and rack gears 4B are installed where said rack gears 4B engage teeth 12 of spur pinions 15 of compounded pinions shown by G1, G2, G3 and G4. The rack gears 4B are recessed minutely, as indicated by 1M in FIG. 5, into wall 1 or into both walls 1 and 3 to prevent their separation by rotating away from compounded pinions G1, G2, G3, and G4. After this, cover 1F is bolted down by screwing bolts 1H into the threaded holes 1C. The spikes 18B and 18C keep springs 17 in place. If desired, then springs 17 can be welded to 18A. Springs 17 can also be installed by providing corresponding holes in floor 1L and in cylindrical portion 4J of piston 4. By sinking bolts 4K to different depths in holes 4A in piston 4, the initial pressure of the springs against cover 4 can be varied. The geometry of the heads of bolts 4K is such that once they are installed in chamber A, then the bolts cannot rotate. Thus the bolts will maintained their constant height in chamber A. The rack gears 4B shown in FIG. 5 and FIG. 10 are situated in clockwise position so that the racks action on the compounded pinions produce unidirectional rotation of gear 2. The use of more than two compounded pinion gears is preferable. In a large size actuator more than four compounded pinion gears can be used.

Figure 13:
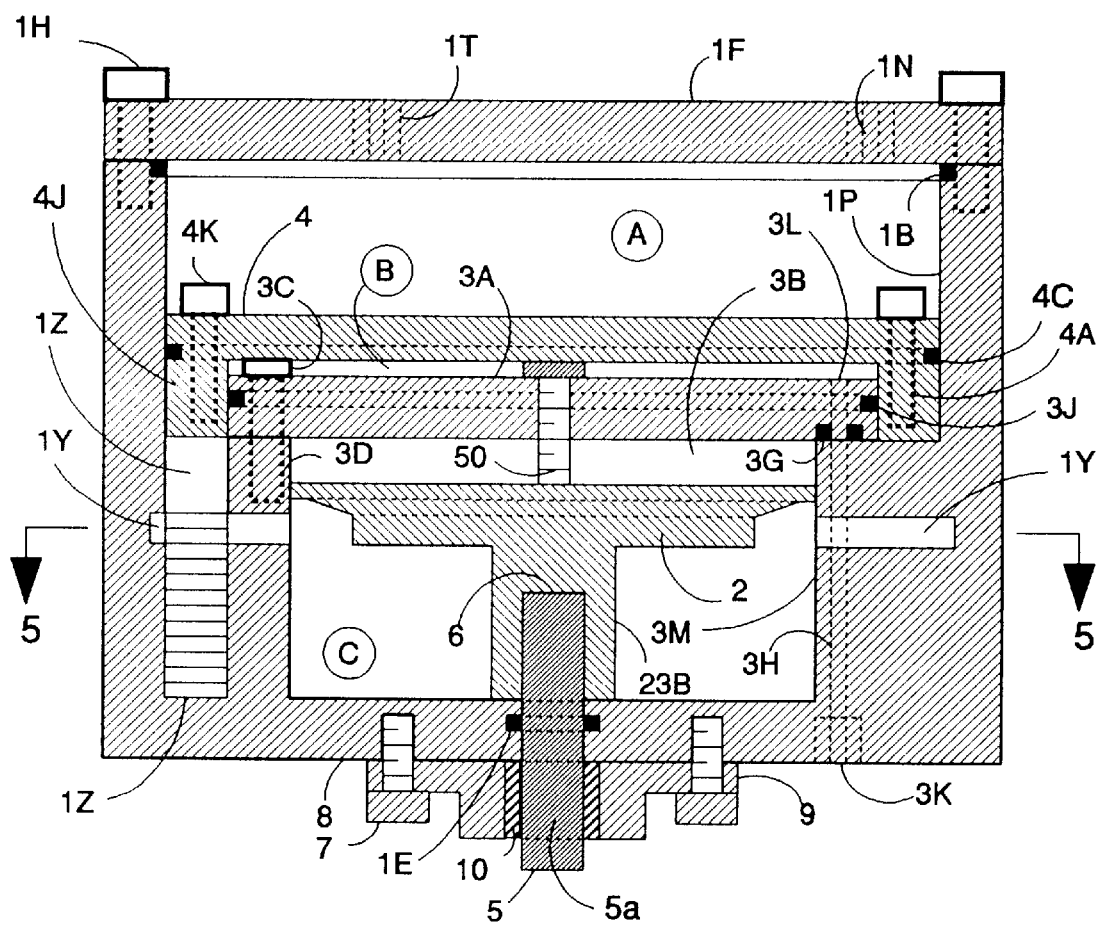
FIG. 13 is a vertical section of the actuator for the second alternative, where a series of individual cavities for compression springs and racks and compounded pinions encircle the inner enclosure.

With the aid of FIGS. 10 and 13, a preferable second alternative to the installation of springs, compounded pinions, and racks will be explained now: In FIGS. 10 and 13 a portion of wall 1 and the entire wall 3 are integrated to become a single expanse which is depicted by 1 in FIG. 10. Each spring is provided a circular cavity 18A of predetermined depth which keeps the spring in place. Each cavity parallel to the shaft of the valve lie on a circle concentric to that shaft between inner surfaces 3M and 1P. Cavities depicted by 1Z are provided for racks 4B, and cavities depicted by 1y are provided for compounded pinions G1, G2, G3,and G4. The true orientation of the two bolts 78 and 79 are shown by axis 1—1, and the true orientation of handle 42 is shown by axis 2—2 (not shown with the handle 42) with respect to the compounded pinions, in FIGS. 5 and 10. To keep the number of FIGS. to a minimum, different orientations (as shown in the drawings) of handle 42 and bolts 78 and 79 were assumed. From here on, the words "shaft" and "stem", when used in explaining the override drive, will be considered synonymous.

Figure 2:
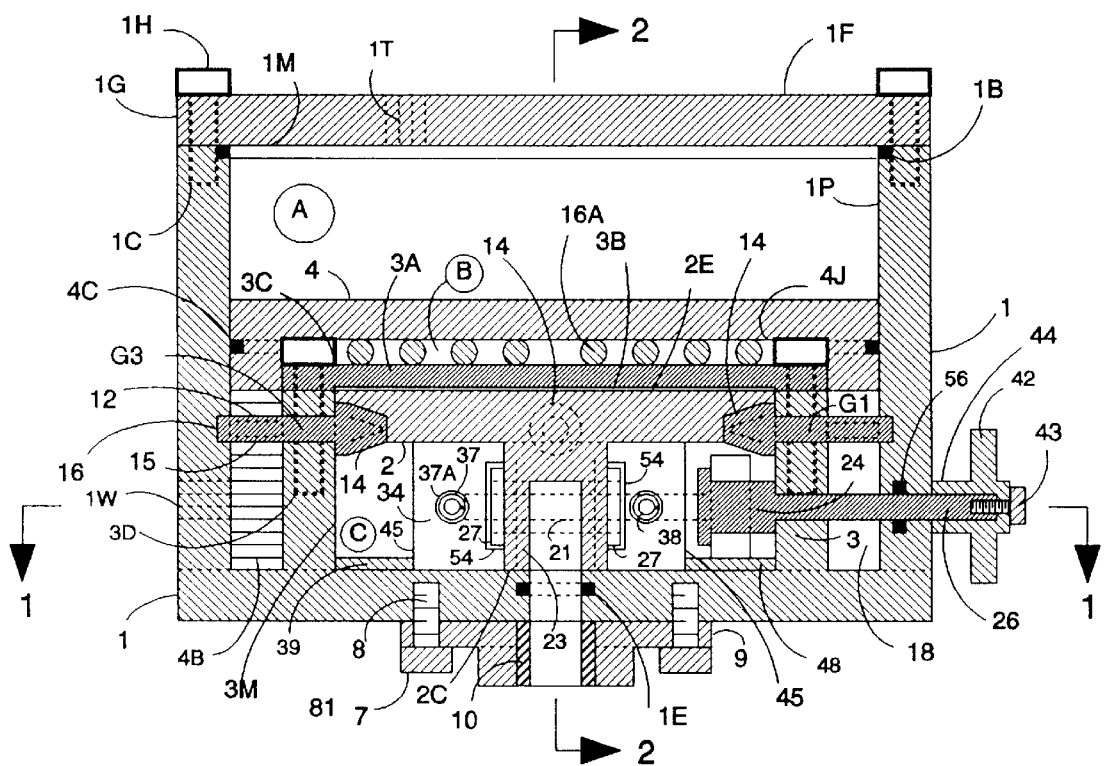
FIG. 2 is the same vertical section as in FIG. 1, where an override drive is installed in the chamber C of FIG. 1.
Figure 4:
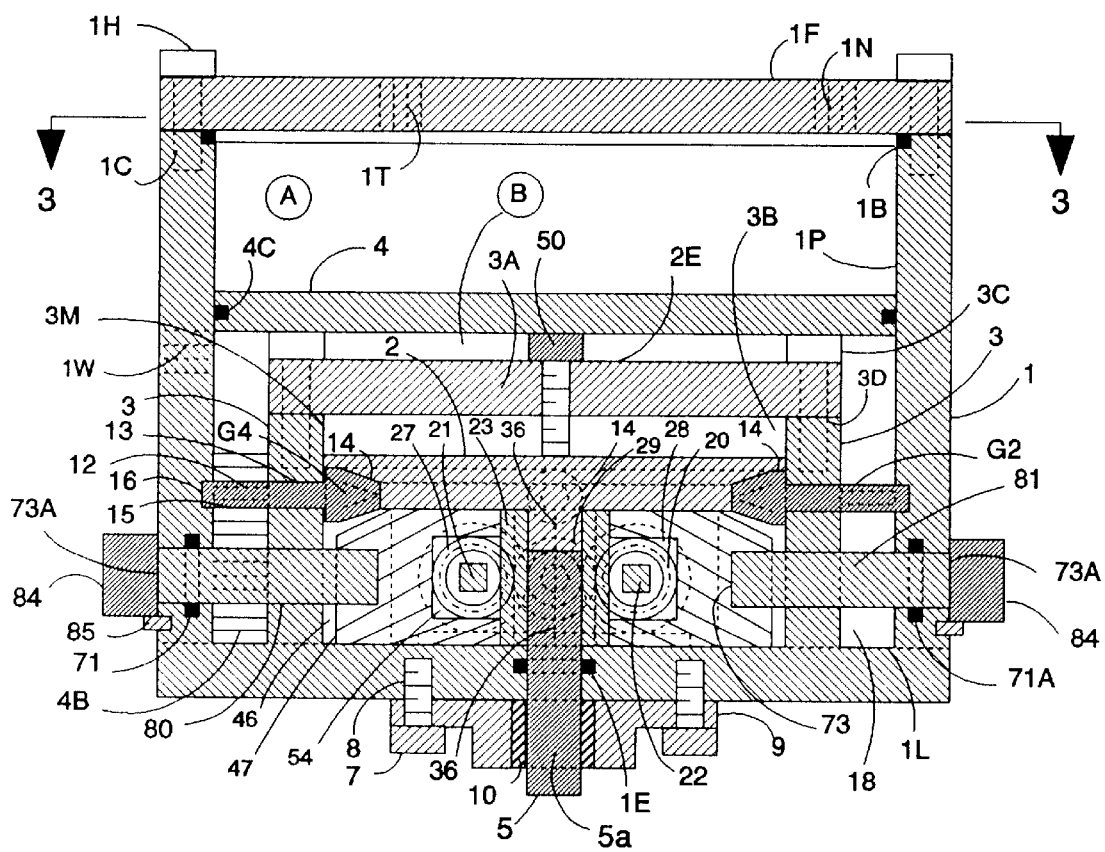
FIG. 4 is a vertical section taken [at] on the line 2—2 in FIG. 2.

FIG. 1 shows the valve in fully opened position. Air or any hydraulic media is used in chamber A to push piston 4 away from cover 1F. Along with piston disk 4 rack gears 4B move parallel to shaft A, and their engagement with compounded pinions G1, G2, G3 and G4 cause the rotation of gear 2 which rotates the shaft of the valve. FIGS. 1, 2 and 4 show the hub of bevel gear 2 to be a worm gear 23, while it is shown as hub 23B in FIGS. 6, 7 and 13. Said hub rotates shaft A to open or to close the valve. The bolts 3C provide a limit beyond which the piston disk 4 cannot travel, thus 3c limits the torque which can be applied against the shaft and the valve. Bolts 3C arrest any damaging excessive torque. The springs 17 and 16A provide dependable fail safe closure in the event of air supply failure. When the air supply fails, the springs automatically relax to push the piston disk 4 back to close the valve.

The actuator can also function without the springs where pressurized air or any pressurized fluid is used to create differential pressure in chamber A and chamber B. Chambers B and C are hydraulically communicative, and, therefore, the same pressure will prevail through them. The actuator depicted in FIGS. 13 and 10 can be operated with a reversible pump, where chambers A and B are completely filled with the fluid, preferably lubricating oil. It will be preferred that the chamber C is also filled with the same media. Chamber B is isolated from chamber C and from cavities 1Z for the compounded pinions, by providing gasket 3G and seal 3J, and also by lengthening cylinder 4J for the full stroke of piston 4. The inlet openings 1N and 3K are connected to the reversible pump via tubes ([]not shown). Bored duct 3H opens into chamber B at 3L. The reversible pump empties one chamber while filling the other chamber. Thus, the piston disk is moved and the shaft of the valve is rotated to close or to open the valve. It is not required by the invention, but it is preferred, that inlet opening 1T be connected to a small spring gauged pressurized reservoir to maintain constant volume of oil in chambers A and B. If any leak occurs, by reading the gauge, it can be detected. This type of actuator is powered strictly by the fluid held in its own reservoir made of chambers A and B, and no outside reservoir for pressurized fluid is needed, and no springs are required. Therefore, cavities 18A along with springs can be eliminated. Restriction barriers 39 and 48, used for the manual override located in chamber C, will be explained later with the override drive. The invented actuator is simply placed over flange 9 of the valve by mounting hub hole 2B, FIG. 1, of worm gear 23 or hub 23B, FIG. 13, over shaft A. The actuator is bolted down by screwing bolts 7 into threaded openings 8. Bushing and seals are shown by 10, 1B and 4C and 1E.

Figure 3:
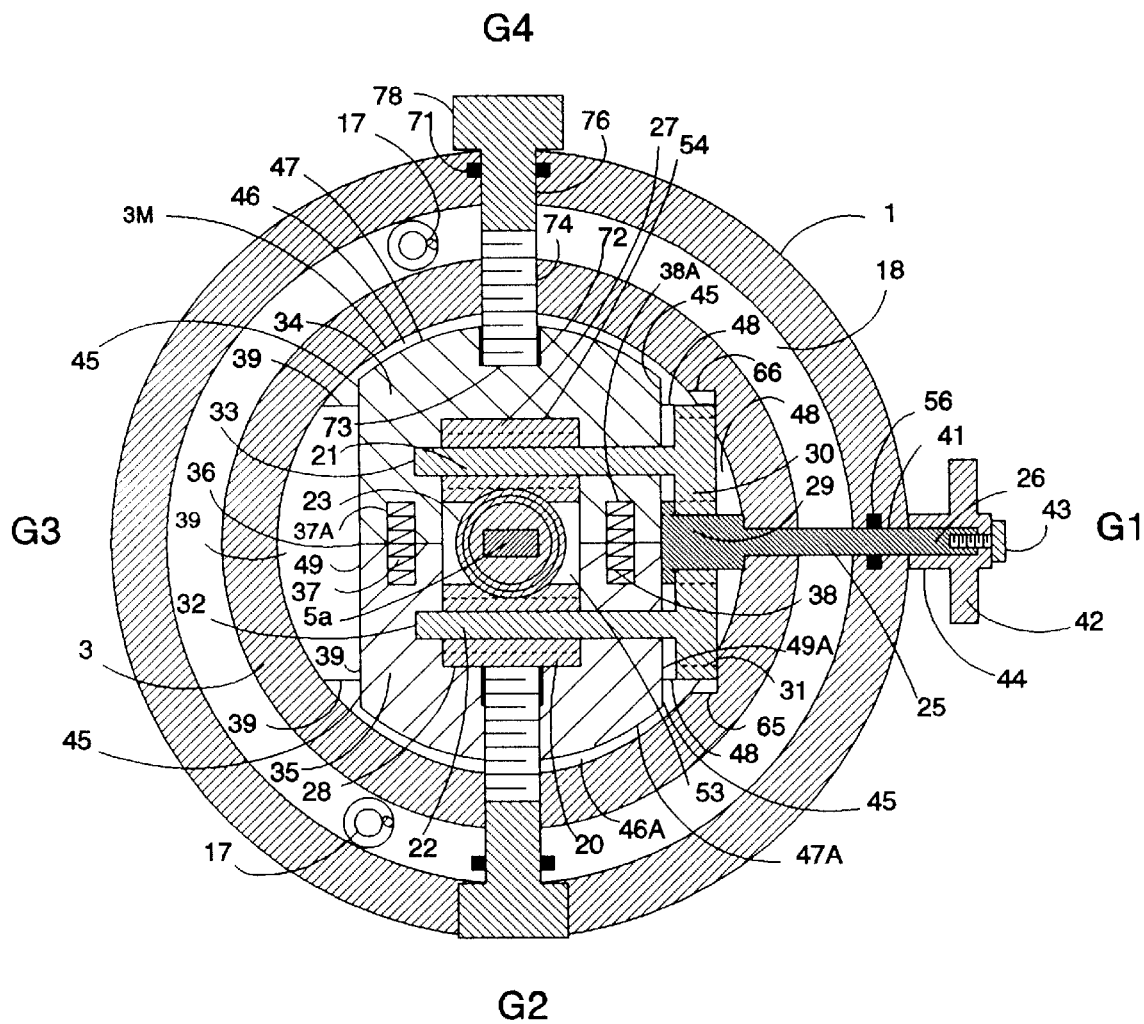
FIG. 3 is a horizontal traverse transverse section taken [at] on the line 1—1 in FIG. 2.

FIGS. 2, 3, 4, 8 and 9 depict the actuator when it is equipped with an override drive; therefore these FIGS. will be explained together. For clarity, bolt 50 shown in FIG. 4 is not shown in FIG. 2. The override drive can be engaged or disengaged by two alternative means, that is, of two bolts 78 and 79 as shown in FIG. 3 or by means of two pins 80 and 81 shown on opposite sides of the actuator in FIGS. 4 and 8, which pins can be actuated simultaneously by mean of the camming surfaces of grooves 82 and 83 of split ring 84.

Figure 8:
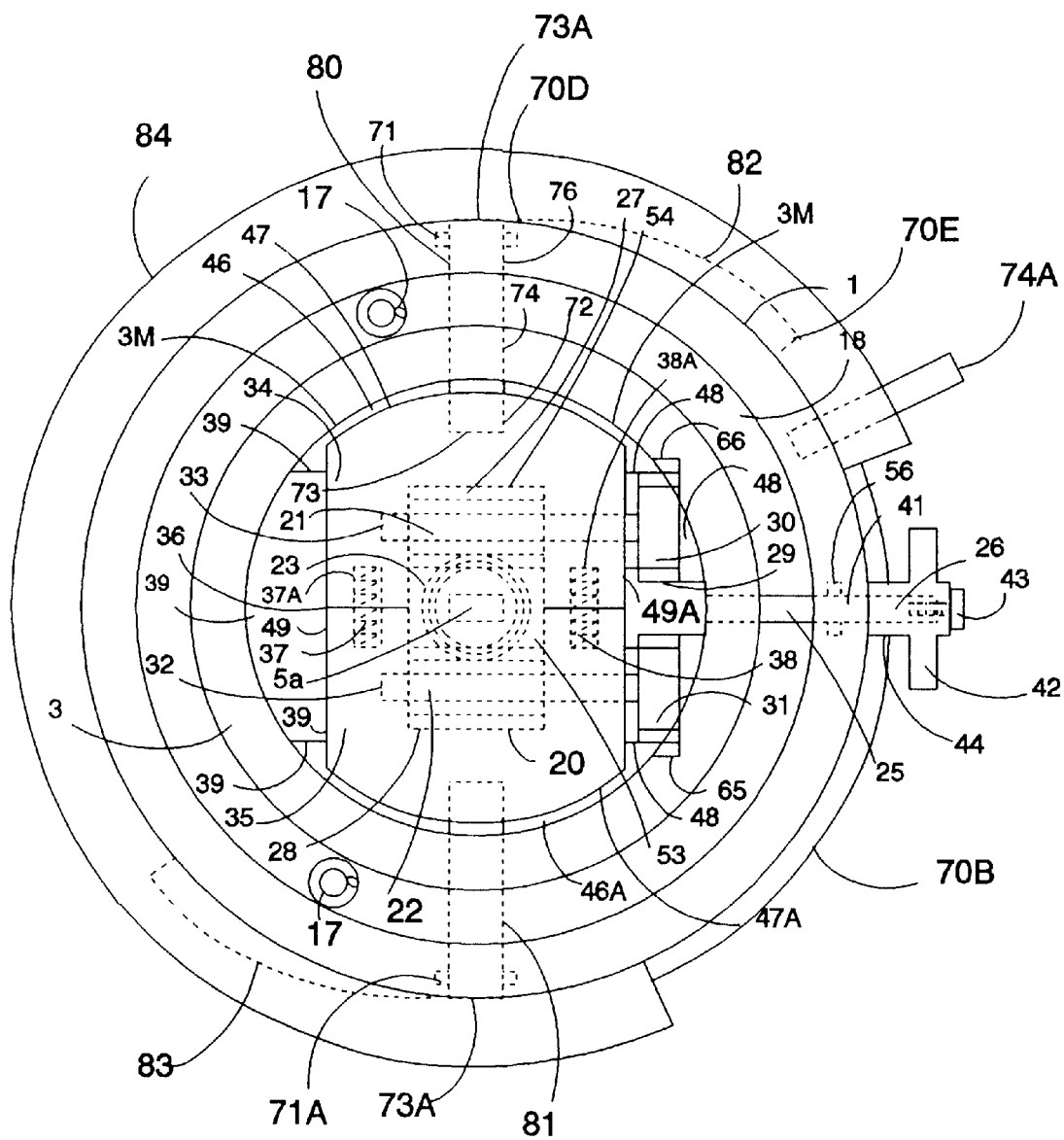
FIG. 8 is a top plan view of FIG. 4 taken on the line 3—3 by removing the covers, the piston, and all the gears to expose the override drive.

As shown in FIGS. 3, 4 and 8, the manual override drive has a common driving spur gear 29 engaged with two spur gears 30 and 31 in chamber C. Gear 29 has stem 25 installed through openings 41 in walls 1 and 3, where shaft 25 is driven by means of handle 42 by mounting it over end portion 26 of 25, and 42 is held to 25 by means of bolt 43. Two spur gears 30 and 31 and two worms 27 and 20 are held in tandem by means of stems 21 and 22 around worm gear 23 where, worms 27 and 20 act together as a couple to rotate worm gear 23 which is integrated with the main bevel gear 2 in chamber C. Worm gear 23 is located in cavity 53 and it is connected to shaft A of the valve being controlled. Worm 27 with stem 21, and worm 20 with stem 22 are installed inside the opened ended cavities 54 and 28 created in blocks 34 and 35. Ends of 21 and 22 are depicted by 33 and 32. In FIG. 2 two opposite sides of block 34 are depicted by 45. The movable blocks 34 and 35 act as carriages for the override drive which are held in place by the sides 49 and 49A of barriers 39 and 48. Blocks 34 and 35 share common compression springs 37 and 38 mounted in oppositely matching cavities provided in the bodies of the block. Such two cavities 37A and 38A are depicted in block 34. Two bolts on opposite sides of the actuator in FIGS. 3 and 5 are shown by 78 and 79. Stems of bolts 78 and 79 are held in place by means of openings depicted by 76 in the wall of enclosure 1 and threaded opening 74 in the wall of enclosure 3. Each bolt is engaged in hole 72 against surface 73 of the block. Bolts 78 and 79, and springs 37 and 38 mounted in said blocks form a mechanism which engages or disengages the override drive. Shown in FIG. 3 these bolts keep block 34 and 35 in check to engage two helix worms 27 and 20 with worm gear 23 to make a couple, where one worm is the right hand worm and the other worm is the left hand worm.

When bolts 78 and 79 are receded, springs 37 and 38 relax to push blocks 34 and 35 apart, which disengage worms 27 and 20 from the worm gear 23. Also, it simultaneously disengages spur gears 30 and 31 from spur gear 29. The transverse movement of block 34 is permitted by space 46 provided between side 47 of block 34 and inner face 3E of 3; and transverse movement of block 35 is permitted by space 46A provided between side 47A of 35 and inner face 3M of 3. Cuts 65 and 66 in wall 3 allow the transverse movement of spur gears 30 and 31.

Broken ring 84 in FIG. 8 which provides the quickest means to engage or disengage the override drive will be explained now: The ring 84 can be rotated around cylindrical wall 1 using bolt handle 74A. The ring 84 rides on ring 70B installed in a groove around 1. The locking position of pins 80 and 81 against ring 84 is shown by 73A, where threaded bolt handle 74A secures the locking of ring 84 with 1. By releasing bolt 74A from 1 the ring can be rotated counter clockwise till ends 70E of the camming surfaces of grooves 82 and 83 move over heads 73A of pins 80 and 81. Springs 37 and 38 push the blocks 34 and 35 apart along with assemblies of gears in tandem. Pins 80 and 81 also are pushed apart against the camming surfaces of grooves 82 and 83 when the override drive is disengaged. The length of each camming groove 82 and 83 is depicted by 70D and 70E respectively. The ring 84 can be a full ring if it is installed above or below hub 44. This would eliminate conflict with handle 42.

FIG. 6 is the same as FIG. 1 except that springs are removed. Operated manually, screw drive 45 is made of diametrically expansive screw 4G having threads 4J. Screw 4G is installed in chamber A and chamber B by passing 4G through threaded opening 4H of piston 4. Lower stem 4K keeps cover 3A and bevel gear 2 separated. Narrow sections 4L and 4M keep screw 4G in rotatable position between covers 1F and 3A. Stem 4S is for the handle to drive the screw. A weather seal in FIG. 6 is shown by 4T. To cut the weight of the screw, the body of the screw 4G can be hollowed out by creating cavities like 4W. This type of screw drive can meet the requirements of valves requiring very high torque, and it also keeps the valve locked at any setting. The actuator shown in FIG. 6 also can be operated by electric motor.

FIG. 7 is the same as FIG. 6 except screw drive of FIG. 6 now is a helical drive. The diametrically expansive cylindrical body 4G is provided with external helical grooves. Outlines of one groove is depicted by 4N. Each groove is fitted with a tooth 4Z provided by a circular opening at the center of piston 4. Two opposite teeth to travel in their separated grooves are shown by 4Z. Chamber A is provided with compression springs 17A. The helical drive shown in FIG. 7 is needed when a quick action quarter turn valve is required. An electric motor may be used to rotate 4S. Upon electrical failure, the springs 17A relax, and 4 is pushed back to shut the valve in a position as shown in FIG. 7.

Figure 9:
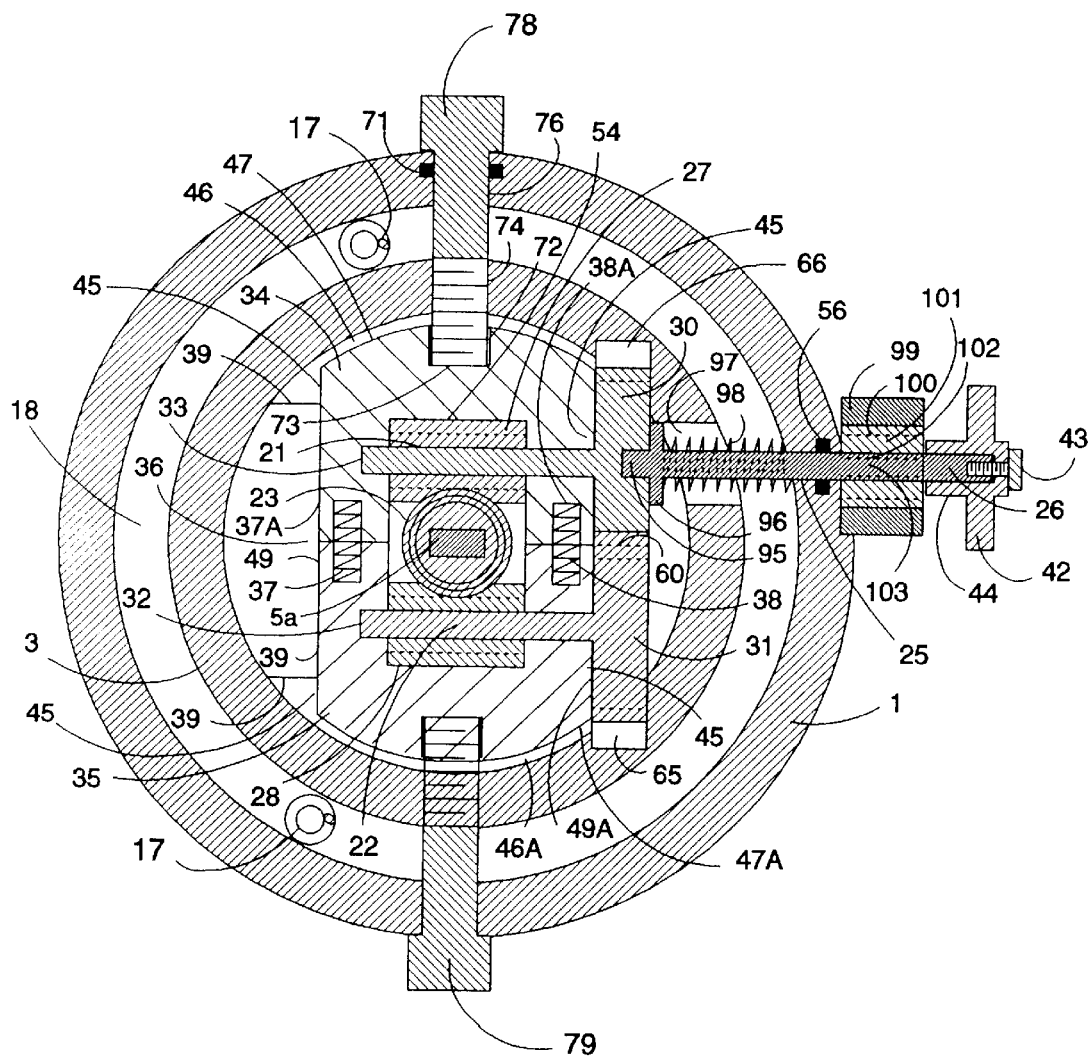
FIG. 9 is a horizontal transverse section similar to that of FIG. 3 showing an alternate design of the override drive.

FIG. 9 is the same as FIG. 3 except that spur gear 29 is eliminated and spur gear 30 is linked directly to stem 25 which, as in FIG. 3, is rotated by handle 42 to actuate the override drive. In this modification of design, before the separation of blocks 34 and 35, stem 25 has to be freed from the spur gear 30. Stem 25 along with compression spring 98 is mounted from inside the actuator before assembling other parts of the actuator. Once stem 25 with spring 98 is mounted in place, then two halves of a split nut 101 are mounted over the threaded portion of 103 of stem 25. The nut 101 has internal and external threads depicted by 102 and 100. Then nut 99 is mounted over nut 101, and handle 42 locks nut 101 in place. By advancing nut 99 toward the actuator, end portion 95 and 96, of 25, is pulled out of spur gear 30, and blocks 34 and 35 can be separated as explained earlier. On relaxing the spring 98, end 95 of 25 is linked again with the spur gear 30. The advantage of using only two spur gears as in FIG. 9 is that when 25 is rotated clockwise the spur gear 30 is also rotated clockwise and spur gear 31 is rotated counterclockwise. Thus two right hand helix worms can be used to make a couple around worm gear 23. But in FIG. 3, one worm has to be the right hand worm and the other worm has to be the left hand worm to create a couple around worm gear 23.

Unlike any other actuator, the invented actuator needs only a single moving seal 4C which is a benefit in many applications. This Actuator is symmetric, compact and versatile compared to other actuators. It is understood that the actuator is made of metals. The embodiment and the components of the actuator can equally be made from various types of engineering material including plastics currently used in the industry. It is understood that the design and the number of seals and bushing can be modified according to the requirements of the customer. Further, springs can be mounted in any chamber or chambers or springs can be eliminated from any chamber or chambers, as required by the customer. It is understood that means to hold an electric motor, and other accessories to mount hydraulic or pneumatic means, can be incorporated on or around the actuator. It is also understood that if spring 16A is not used in chamber B in FIG. 1 and 2 then cover 3A is not required; washers fastened to 3 by means of bolts 3C will be sufficient to keep gear 2 in rotatable position. It also is understood that various types of covers for enclosures different from the covers shown in the drawings can be used without changing the functionality of the actuator. It is understood that various changes may be made in adapting the invention to different embodiments without departing from the broader inventive concepts disclosed herein and comprehended by the claims that follow.

I claim:

1. An axial actuator to actuate a valve by turning the shaft of such valve, comprising:
    an outer enclosure forming an interior space;
    an inner enclosure within the interior space of the outer enclosure;
    a piston linearly movable within the interior space of the outer enclosure to divide the interior space into two chambers, one chamber including the inner enclosure, said piston having racks extending therefrom;
    a rotation device positioned at least partially within the inner enclosure and adapted to be secured to the shaft of the valve to be rotated by the actuator, said rotation device including a bevel gear having a hub adapted to receive the shaft of the valve to be rotated by the device; and
    interconnection structure supported by the inner enclosure interconnecting the movable piston and the rotation device to cause rotational movement of the rotation device upon linear movement of the piston within the interior space, said interconnection structure including mating compound pinion gears each having a bevel pinion gear and a spur pinion gear, each said compound pinion gear being positioned so that the bevel pinion ,ear mates with the rotation device bevel gear and the spur pinion gear mates with one of the racks extending from the piston.

2. An axial actuator according to claim 1, wherein the bevel pinion gear and the spur pinion gear are positioned at opposite ends of a stem, wherein the inner enclosure is formed by a wall, and wherein the stem is journaled in the wall forming the inner enclosure.

3. An axial actuator according to claim 2, including a plurality of cavities separated from the interior space formed by the inner enclosure by the wall forming the inner enclosure; wherein the pinion spur gears are positioned in the cavities, and wherein the racks extend from the piston into the cavities.

4. An axial actuator according to claim 2, wherein the piston is biased to a rest position in the interior space formed by the outer enclosure.

5. An axial actuator according to claim 4, wherein the piston is biased by at least one spring.

6. An axial actuator according to claim 5, wherein an intermediate space is formed in the interior space formed by the outer enclosure outside the inner enclosure, and wherein the at least one spring is a plurality of springs located in the intermediate space.

7. An axial actuator according to claim 6, wherein the outer enclosure is cylindrical.

8. An axial actuator according to claim 7, wherein the piston is moved by pressurized fluid admitted to the interior space on one side of the piston.

9. An axial actuator according to claim 8, wherein the piston is moved by pressurized fluid pumped by a reversible fluid pump from one side of the piston to the other side of the piston.

10. An axial actuator according to claim 8, additionally including means to manually override and manually operate the actuator.

11. An axial actuator according to claim 10, wherein the bevel gear hub includes a worm gear and wherein the means to manually override includes a manually operated gear co-operable with the bevel gear worm gear.

12. An axial actuator according to claim 10, additionally including means to engage the manually operated gear with the bevel gear worm gear when desired to manually operate the actuator.

13. An axial actuator according to claim 11, wherein the means to engage the manually operated gear includes two worm gears which slide from opposite sides into engagement with the bevel gear worm gear when desired to manually operate the actuator.

14. An axial actuator according to claim 1, wherein the piston includes a threaded opening therethrough, and additionally including a threaded shaft extending through the threaded opening, and means for rotating the threaded shaft to move the piston within the interior space formed by the outer enclosure.

15. An axial actuator according to claim 1, wherein the piston includes an opening therethrough, additionally including a shaft extending, through the opening and having at least one helical groove therein, at least one tooth extending from the piston into the at least one helical groove, and means for rotating the shaft to move the at least one tooth along the at least one helical groove to thereby move the piston within the interior groove found by the outer enclosure.

16. An axial actuator according to claim 1, wherein the piston is biased to a rest position in the interior space.

17. An axial actuator according, to claim 1, wherein the piston is moved by pressurized fluid admitted to the interior space on one side of the piston.

* * * * *